Figure 1:
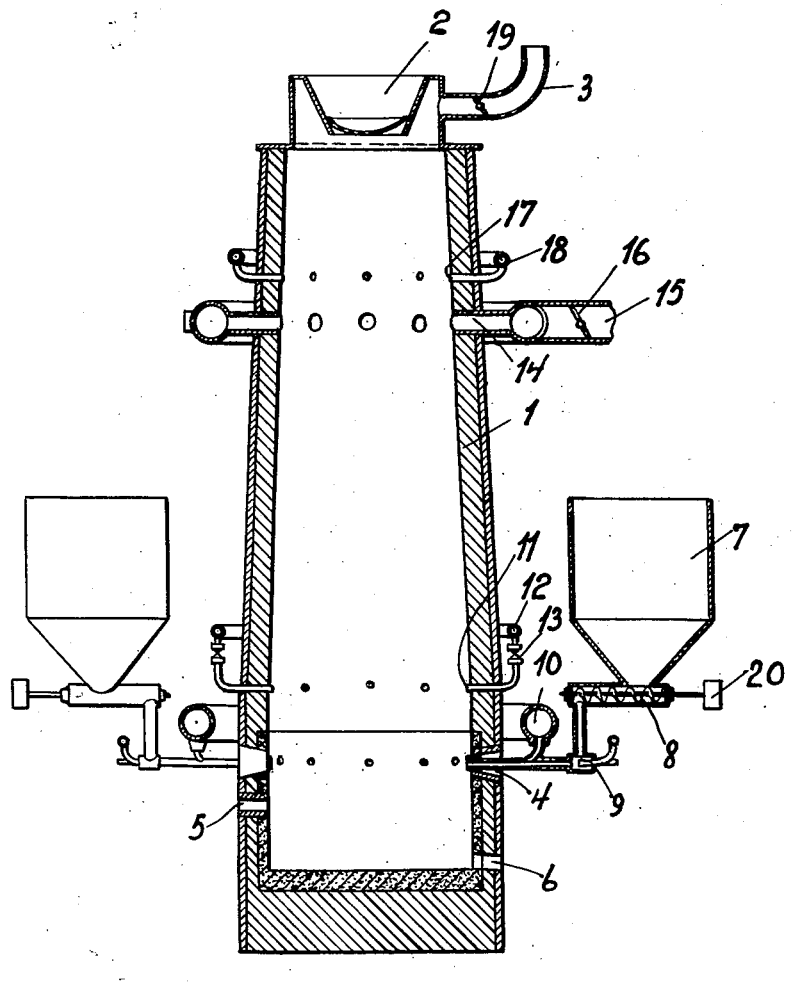

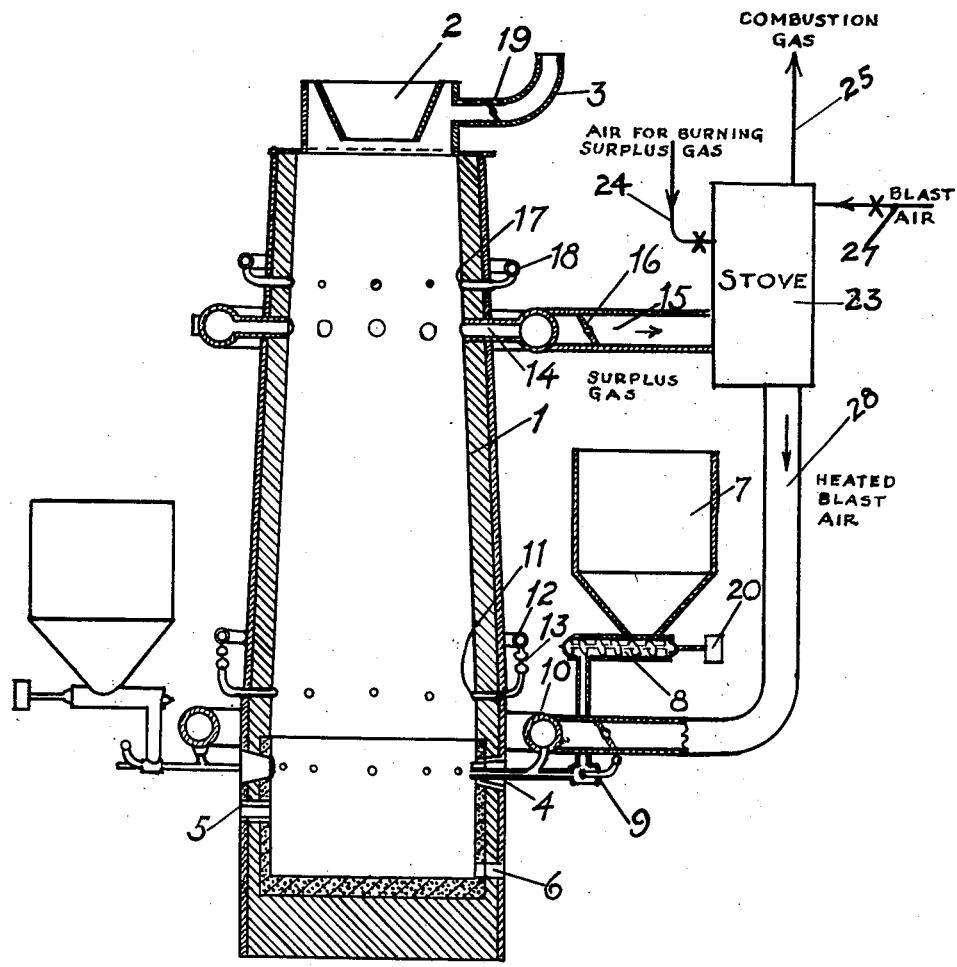

2,795,497
METHOD AND APPARATUS FOR PRODUCING MOLTEN IRON

Hans I. Elvander, Degerfors, Sweden

Application April 19, 1954, Serial No. 424,182

Claims priority, application Sweden April 23, 1953

19 Claims. (Cl. 75—41)

This invention relates to reduction processes in shaft furnaces. More particularly the invention relates to a process and an apparatus for the reduction of oxides of iron and related metals, in which the metallic oxides are charged to the top of a shaft furnace and molten metal is discharged from the bottom of the furnace.

In the conventional blast furnace process, the ore and the reducing agent are charged to the top of the furnace, and meet reduction gases passing upwards. Processes are known, in which part of the reducing agent is charged together with the ore, and the remaining reducing agent is introduced through the ordinary tuyeres, or through separate tuyeres situated at a higher level. Both said methods, however, involve a partial oxidation of the reducing agent by ascending gas, part of the reducing agent being thereby lost ("solution loss"). Therefore, for the reduction of an oxidic ore in a shaft furnace, the reducing agent shall, as a principle, be introduced in the lower part of the shaft and pass upwards, in countercurrent to the charge, said oxidation of the reducing agent being thereby avoided. The ore, containing no reducing agent, can be preheated in the upper part of the shaft by burning the gas passing upwards. Thus, the available heat for the endothermic reactions in the shaft will be greater than in the conventional blast furnace process, where the available heat originates only from the heat content of the gas passing upwards. Efforts have been made to save reducing agent by increasing the oxygen content of the blast. These efforts have not been successful, due to the fact that the amount of furnace gas simultaneously decreases, and consequently the available heat for the endothermic reactions will not be sufficient, the prereduction will decrease and the furnace gas will not be effectively utilized.

The principle of passing the reducing agent in countercurrent to the charge is utilized in the Wiberg-Söderfors method for producing sponge iron. For many purposes, however, a melted product is desired. Practically, it is rather difficult to melt the sponge iron in a Wiberg-Söderfors furnace in the lower part of the shaft by means of known methods. Among other things it is necessary that the temperature in the shaft does not become too high. At the reduction of iron oxides in a shaft furnace the reduction proceeds satisfactorily only in a narrow temperature range. At a somewhat higher temperature the charge has a tendency of sintering and sticking in the shaft. The critical temperature will easily be exceeded, as the reaction

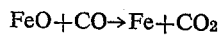
$$FeO + CO \rightarrow Fe + CO_2$$

is exothermic. In the conventional blast furnace process the reaction

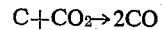
$$C + CO_2 \rightarrow 2CO$$

proceeds to the right if the temperature increases, and thus automatically prevents a temperature rise.

In the Wiberg-Söderfors process a harmful temperature rise is prevented by the reducing gas being given a sufficiently high content of hydrogen, because the reaction

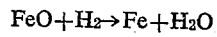
$$FeO + H_2 \rightarrow Fe + H_2O$$

is endothermic.

In the method according to the present invention, no reducing agent is charged together with the ore. The ore is prereduced in the upper part of the shaft and is finally reduced and melted in the lower part of the shaft. The method comprises charging iron oxides and slag forming agents to the top of the furnace, introducing a solid reducing agent into the melting zone of the furnace, introducing blast gas into the melting zone of the furnace in an amount sufficient for a partial combustion of the reducing agent, introducing a cooling agent into the shaft above the melting zone of the furnace in an amount sufficient for maintaining the temperature of the charge in the reducing zone below the sintering and sticking temperature, and discharging molten iron and slag from the bottom of the furnace.

The cooling agent may be a gas e. g. hydrogen or a hydrocarbon, or a liquid, e. g. fuel oil. The hydrocarbon may be propane or methane, e. g. in the form of natural gas. The reducing agent is introduced into the shaft at a level between the melting zone and the reducing zone. If a hydrocarbon is introduced, the gas will decompose, and the precipitated carbon will react with the carbon dioxide of the furnace gas, thus bringing about a further decrease of temperature.

The method according to the invention can be carried out by charging iron oxides and slag forming material to the top of a shaft furnace. No reducing agent is contained in the charge. At a suitable level of the shaft the gas passing upwards is combusted, thus preheating the charge. Surplus gas may be drawn off at a somewhat lower level, to be utilized in a heater for preheating the blast gas. The charge, passing downwards in the shaft, is reduced by the gas originating partly from the fuel, introduced into the melting zone, partly from the cooling agent, introduced above the melting zone.

The blast gas is oxygen or air, possibly enriched in oxygen, and is possibly preheated to a suitable temperature, preferably by means of surplus gas from the shaft. The blast gas can be introduced admixed with the fuel in a burner, or it can be added partly or totally separated from the fuel.

The molten metal and the slag accumulate at the bottom of the melting zone and are discharged in a manner known per se. The carbon content of the melted metal can be controlled to a certain degree by varying amount of fuel.

The present invention offers the following advantages.

1. An inexpensive fuel can be used, e. g. coal dust or coke dust. The reducing cooling agent which must be added for cooling the charge only amounts to a small part of the total amount of fuel. For instance, in a shaft furnace with an oxygen blast, coal dust being used as reducing agent, it is sufficient to add fuel oil in an amount of about 10 percent of the total amount of fuel.

2. The fuel demand is low, due to the fact that (1) the charge can be preheated by burning gas in the upper part of the shaft, (2) said gas, before being burnt, has been utilized effectively for reducing the ore, and (3) the blast temperature can be higher than in conventional blast furnaces.

3. The advantages involved in using an oxygen blast can be utilized effectively. Said advantages are (1) the capacity of the furnace will increase, compared to an air blast furnace, (2) the furnace gas has a high heating value, (3) the building costs for the furnace will be low, compared to an air blast furnace, due to the fact that the furnace can be made smaller and that no blast heaters are necessary and (4) iron alloys can be manufactured due to the high temperature in the melting zone. These advantages are obtained with a lower consumption of reducing agent and oxygen than in the well-known oxygen blast furnaces.

4. In comparison with the well-known method of charging the ore and the reducing agent to the top of the shaft, but separated by a partition wall, the method according to the present invention offers the following advantages: (1) no partition wall is necessary, (2) natural reducing agents, rich in gas, may be used, e. g. coal, without being coked before being introduced into the shaft, and (3) the amount of reducing agent added may be controlled exactly and in a very simple manner, and the proportion between reducing agent and blast gas may be controlled and varied exactly.

The present invention also relates to a shaft furnace for carrying out the method according to the invention. The furnace according to the invention will now be more fully described with reference to the attached drawing, in which Fig. 1 illustrates diagrammatically one embodiment of the furnace, and in which Fig. 2 diagrammatically illustrates a modified form of apparatus including blast-heating means.

The furnace comprises a shaft wall 1, constructed in a manner known per se, a charging device 2 for the iron oxides, an outlet pipe 3 for the furnace gases, tuyeres 4, a discharge opening 5 for the slag, and a discharge opening 6 for the molten iron. Feed hoppers 7 for the finely divided reducing agent are connected to the tuyeres. The finely divided reducing agent is fed from the feed hoppers 7, by means of the feed screws 8, rotated by the motors 20 and is blown into the tuyeres by means of high pressure oxygen or air, introduced through the nozzles 9. In the tuyeres, the reducing agent is mixed with the blast gas, which is added from the pipe 10. Above the melting zone of the furnace, nozzles 11 are provided for introducing a cooling agent into the shaft. The cooling agent, which may be a gas or a liquid, is added through the pipe 12, and is regulated by means of valves 13. In the upper part of the shaft, there are provided gas outlets 14, connected to the gas discharge pipe 15. The amount of surplus gas discharged is regulated by means of the throttle valve 16. Above said gas outlets there are provided nozzles 17 connected to a pipe 18, for introducing air into the shaft. The furnace gas is combusted by means of said air, thus preheating the iron oxide. The combusted furnace gas is discharged through the outlet pipe 3, regulated by the throttle valve 19.

If desired, the surplus gas discharged through the pipe 15 may be used for preheating the blast gas, either by being passed through a heat exchanger or by being combusted in a regenerator, a so-called stove. According to the modification illustrated in Fig. 2, the apparatus additionally comprises an arrangement for preheating the blast gas by the latter of the two alternative measures just mentioned. For this purpose a regenerator or hot blast stove 23 is provided, into which stove surplus gas, diverted from the shaft 1 by means of gas discharge pipe 15, discharges and into which combustion air for burning such surplus gas is introduced through valved air conduit 24. The gaseous products of the combustion of the surplus gas are led out of stove 23 by discharge conduit 25. Blast air to be heated is delivered to stove 23 by means of valved blast air main 27, while heated blast air is delivered to pipe 10 by heated blast air conduit 28.

In the illustrated embodiment the reducing agent is mixed with the blast gas in the tuyeres. If desired, the reducing agent may be introduced through separate nozzles.

What I claim is:

1. A method for the production of molten iron in a blast furnace, comprising introducing into the top of the furnace a burden consisting of iron oxides and slag forming agents, introducing a solid reducing agent into the melting zone of the furnace, introducing blast gas into the melting zone of the furnace in an amount sufficient for a partial combustion of the reducing agent, introducing a cooling agent into the shaft above the melting zone of the furnace in an amount sufficient for maintaining the temperature of the charge in the reducing zone of the shaft below the sintering and sticking temperature, and discharging molten iron and slag from the bottom of the furnace.

2. A method as claimed in claim 1, in which the cooling agent is a gas.

3. A method as claimed in claim 2, in which the cooling agent is taken from the group consisting of hydrogen, methane, and propane.

4. A method as claimed in claim 1, in which the cooling agent is a liquid.

5. A method as claimed in claim 1, in which the cooling agent is fuel oil.

6. In the method as claimed in claim 1, the step comprising preheating the charge in the upper part of the shaft.

7. In the method as claimed in claim 1, the step comprising discharging surplus gas from the shaft and burning the remaining gas in the upper part of the shaft, thus preheating the charge.

8. A method as claimed in claim 1, in which the reducing agent is a finely divided solid fuel, preferably coal breeze or coke breeze.

9. A method as claimed in claim 1, in which the blast gas is air enriched in oxygen.

10. A method as claimed in claim 1, in which the blast gas is oxygen.

11. In the method as claimed in claim 1, the step comprising preheating the blast gas before introducing it into the furnace preferably utilizing surplus gas from the shaft.

12. A method as claimed in claim 1, in which the blast gas is introduced into the furnace at least partly separated from the reducing agent.

13. A blast furnace for the production of molten iron from iron oxides, comprising a shaft furnace having a charging device for iron oxides and slag forming agents on the top of the furnace, a discharge pipe for furnace gases on the top of the furnace, tuyeres for introducing an oxygen containing gas into the lower part of the shaft, discharge openings for the molten iron and discharge openings for the slag formed, charging devices being provided at the lower part of the shaft for introducing a solid reducing agent into the melting zone of the furnace, and nozzles being provided at a higher level for introducing a cooling agent into the shaft above the melting zone of the furnace.

14. A blast furnace as claimed in claim 13, comprising gas nozzles for blowing the solid reducing agent into the reducing zone of the furnace.

15. A blast furnace as claimed in claim 13, characterized in the charging devices for the solid reducing agent being connected to the tuyeres.

16. A blast furnace as claimed in claim 13, comprising outlet openings for surplus gas, said outlet openings being provided in the upper part of the shaft.

17. A blast furnace as claimed in claim 13, comprising nozzles for introducing air into the upper part of the shaft.

18. A blast furnace as claimed in claim 17, characterized in that outlet openings for surplus gas are provided in the upper part of the shaft, and in that said nozzles are provided above said outlet openings.

19. A blast furnace as claimed in claim 13, comprising a preheater for the blast gas said preheater including outlet openings for surplus gas in the upper part of the shaft, a hot blast stove in communication with said outlet openings, conduit means for discharging gaseous products from said stove, and conduit means for passing blast air into and through said stove and thence to said tuyeres.

References Cited in the file of this patent

UNITED STATES PATENTS

| 1,401,222 | Wiberg | Dec. 21, 1921 |
| 1,507,214 | Sommers et al. | Sept. 2, 1924 |

FOREIGN PATENTS

| 700,508 | Great Britain | Dec. 2, 1953 |